United States Patent [19]

Penneck

[11] 4,422,890
[45] Dec. 27, 1983

[54] PROCESS FOR THE MANUFACTURE OF DIMENSIONALLY RECOVERABLE ARTICLES

[75] Inventor: Richard J. Penneck, Lechlade, England

[73] Assignee: Raychem Limited, London, England

[21] Appl. No.: 258,310

[22] Filed: Apr. 28, 1981

[30] Foreign Application Priority Data

May 15, 1979 [GB] United Kingdom ............... 7916725
May 3, 1980 [GB] United Kingdom ............... 8014927

[51] Int. Cl.³ .................. B29C 27/00; B32B 31/00; B32C 13/00; F16L 1/00
[52] U.S. Cl. ............................ 156/73.5; 156/83; 156/86; 156/304.2; 156/304.6; 156/308.4; 156/244.13; 174/DIG. 8; 264/230; 428/36; 428/542.8
[58] Field of Search ............ 156/86, 85, 84, 214, 156/218, 73.5, 83, 229, 272, 304.2, 304.6, 307.3, 308.4, 308.6, 244.13; 264/229, 230, 173, 515, 150, 22; 174/DIG. 8; 428/36, 53, 52, 515, 542, 500

[56] References Cited

U.S. PATENT DOCUMENTS

| | | | |
|---|---|---|---|
| 3,662,094 | 5/1972 | Wetmore | 156/85 |
| 3,770,556 | 11/1973 | Evans et al. | 156/86 |
| 3,899,807 | 8/1975 | Souish et al. | 156/83 |
| 3,959,052 | 5/1976 | Stanek | 156/86 |
| 4,298,415 | 11/1981 | Nolf | 264/230 |

FOREIGN PATENT DOCUMENTS

| | | |
|---|---|---|
| 1941166 | 7/1976 | Fed. Rep. of Germany ... 174/DIG. 8 |
| 659650 | 10/1951 | United Kingdom . |
| 1151788 | 5/1969 | United Kingdom . |
| 1159675 | 7/1969 | United Kingdom . |
| 1308358 | 2/1973 | United Kingdom . |
| 1351760 | 5/1974 | United Kingdom . |
| 1454838 | 11/1976 | United Kingdom . |

Primary Examiner—Edward C. Kimlin
Assistant Examiner—Louis Falasco
Attorney, Agent, or Firm—Douglas A. Chaikin; Herbert G. Burkard

[57] ABSTRACT

A process for the manufacture of a dimensionally recoverable article comprises forming a plurality of separate component parts thereof, joining the component parts together to form the article, cross-linking the polymeric material from which the parts are formed after they have been joined together, and then expanding the article.

The process enables dimensionally recoverable articles of complex shape to be manufactured by high speed moulding processes or extrusion processes without the need for curing of the article during formation thereof.

10 Claims, 10 Drawing Figures

PROCESS FOR THE MANUFACTURE OF DIMENSIONALLY RECOVERABLE ARTICLES

This invention relates to the manufacture of dimensionally recoverable articles, especially hollow article such as boots, end caps, transitions, udders and splice cases for electrical cables. The use of such articles is well reported in the literature, for example in Proc IEE 1970, 117 (7), 1365–1372.

The invention relates especially to dimensionally heat recoverable articles, that is to say, articles, the dimensional configuration of which may be made substantially to change when subjected to heat treatment. Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,957,372. As is made clear in, for example, U.S. Pat. No. 2,027,962, the original dimensionally heat-unstable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

One manner of producing a heat-recoverable article comprises moulding the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat. No. 1,440,524, an elastomeric member such as an outer tubular member is held in a stretched state by a second member, such as an inner tubular member, which, upon heating weakens and thus allows the elastomeric member to recover.

Such articles have hitherto usually been made by injection, compression or transfer moulding into the desired shape and cross-linking or curing the articles before removing them from the mould. Often, for example, where the articles have internal dimensions greater than those of any of the apertures of the articles, they have to be distorted in order to remove them from the pin or core of the moulding apparatus, and so the article necessarily has to be resiliently deformable at the temperature at which they are removed.

The present invention provides a process wherein a dimensionally recoverable article is assembled from component parts and subsequently cross-linked and expanded.

In one aspect, therefore, the present invention provides a process for the manufacture of an article that is dimensionally recoverable, preferably heat-recoverable, which comprises forming a plurality of shaped component parts of the article from a polymeric material, assembling the component parts to form the article, bonding the component parts together, cross-linking the polymeric material after the component parts have been bonded together and then expanding at least a portion of the article.

The article is usually expanded either by mandrels or by pneumatic expansion of the article to the desired size. One or more of the component parts of the article may be formed by conventional moulding techniques, for example high-speed injection moulding although those parts that are of constant cross-section may be formed simply by extrusion and cut to appropriate lengths. Preferably each part is formed either by injection moulding or by extrusion and has a shape that does not require it to be significantly distorted during formation, that is, so that it does not have to be distorted beyond its elastic limit, thereby allowing a moulded part to be removed from the mould at temperatures below the solidification temperature of the polymeric material. It is possible by this process to form hollow articles such as boots, transitions or udders for electrical cable connections that could not be formed by conventional injection moulding processes without subsequent deformation of the articles, or even at all.

The component parts may be joined together by any method suitable for joining polymeric materials, but it has been found to be particularly advantageous to bond the component parts together by a process involving local fusion of abutting portions thereof, and in particular by welding, for example by ultrasonic welding, hot-plate welding, or friction welding techniques. Less preferred bonding techniques include the use of an appropriate adhesive or solvent, for instance dimethyl formamide for bonding polyvinylidine fluoride parts.

Preferably the parts have abutting portions of circular cross-section in the regions in which they are joined together in which case the parts may conveniently be joined together by spin welding methods wherein the parts are rotated with respect to each other and are pressed together causing frictional heat to be generated which fuses the parts together. Such processes are described in UK Patent specification Nos. 1,063,505 and 1,096,571, the disclosures of which are incorporated herein by reference.

The polymeric material is preferably cross-linked after assembly of the article by irradiation, for example, by means of an electron beam or by $\gamma$-radiation, although in a limited number of cases it may be chemically cross-linked. Radiation dosages in the range 2 to 80 Mrads, preferably 2 to 50 Mrads, for example 2 to 20 Mrads and particularly 4 to 15 Mrads are in general appropriate. Whichever cross-linking process is used, it may be advantageous to incorporate one or more co-curing agents for example polyunsaturated monomers such as triallyl cyanurate, triallyl isocyanurate, diallyl phthalate, ethylene glycol dimethacrylate, trimethylolpropane trimethacrylate, pentaerythritol tetramethacrylate, allyl methacrylate and vinyl methacrylate. One method of chemical cross-linking that may be used in the process according to the invention involves grafting an unsaturated hydrolysable silane on the polymer and subjecting the article to moisture during a curing stage, for example, as described in UK Patent specification Nos. 1,286,460 and 1,357,549, the disclosures of which are incorporated herein by reference.

Any cross-linkable polymeric material to which the property of dimensional recoverability may be imparted such as those disclosed in UK specification No. 990,235 may be used to form the articles. Polymers which may be used in the polymeric material include polyolefins such as polyethylene and polypropylene, and ethylene copolymers for example with propylene, butene, vinyl acetate or ethyl acrylate, polyamides, polyurethanes, polyvinyl chloride, polyvinylidine fluoride, elastomeric materials such as those disclosed in UK specification No. 1,010,064 and blends such as those disclosed in UK specification Nos. 1,284,082 and 1,294,665, and compositions such as those disclosed in German specification No. 2815520 (corresponding to our co-pending UK Application No. 15122/77) and in UK specification No. 2019412. The disclosures of all these specifications are incorporated herein by reference. The polymeric materials can be tailored to suit the intended use by the addition of fillers, e.g. semi-conducting fillers or anti-tracking agents, flame retardants, plasticisers, pigments, stabilisers and lubricants.

Furthermore, the fact that the component parts are initially formed separately makes it possible to use different polymeric materials for different parts so that the properties of the article, such as flexibility or electrical conductivity can be varied within a single article.

The process according to the invention has the advantage that the polymeric material is cross-linked or cured after the article has been formed. Thus, in the case where comparent parts are formed by moulding the parts are cross-linked after they have been removed from the mould, (this being possible because the parts do not have to be significantly distorted to remove them from the injection moulding pins) which allows the mould filling part of the cycle time of the injection moulding process to be reduced. Also, the fact that the polymeric material is cross-linked after the article has been assembled enables it to be cross-linked by irradiation, thereby reducing the time taken for cross-linking, obviating the necessity to incorporate peroxide or other chemical curing agents in the material, and strengthening the bonded regions. The latter feature is particularly significant when the component parts have been bonded together by fusion and results in strong cross-linked bonded regions.

Not only does this lack of peroxide or other curing agent lead to a reduction in the cost of manufacture of the article but it also gives greater freedom of choice for the operating conditions such as temperature and pressure and allows the total cycle time of the moulding process to be reduced since there is no risk of premature decomposition of peroxide or other cross-linking agent which can be caused by frictional heating of the polymeric material in the gates and runners etc, of the moulding apparatus.

Since the polymeric material is cross-linked only after the moulding operation, the quantity of scrap produced in the process can be reduced because any unused material from the moulding operation is not cross-linked and can therefore be re-used.

In many cases, all the component parts of the article will have constant cross-sections and can therefore be produced by extrusion processes, thereby obviating the need for any moulding process.

Often, it is desirable to form udders, transitions or boots having a layer of adhesive to the inner surface or a part thereof and it has so far been necessary to coat the surface manually, by means of a mechanically applied hot-melt system or by means of a spray device, thereby increasing the cost and time for manufacturing the articles. By using the process according to the present invention it is possible to mould the adhesive into a shape having an outer surface configuration corresponding to that of the inner surface of the component part to be coated, and to insert the adhesive shape into the component part before joining the parts together. In this process, the only manufacturing time that is taken in applying the layer of adhesive to the article is the time that is necessary to insert the adhesive shape into any component part, or to leave one or more component parts without a layer of adhesive for example, a part forming a central portion of the article. Any mouldable adhesive, for example a hot-melt adhesive, may be used for the adhesive shape provided that it is not cross-linked, or cross-links only to an extent that does not remove its adhesive properties, when the polymeric material of the article is cross-linked. Since different parts of the article may be required to adhere to different materials, for example to metals and polymers, it may be desirable to use different adhesives to form different adhesive shapes in the same article.

The present invention also provides an article whenever produced by a process according to the invention.

Several forms of article produced according to the invention will now be described, by way of example, with reference to the accompanying drawings in which.

Figure 1:
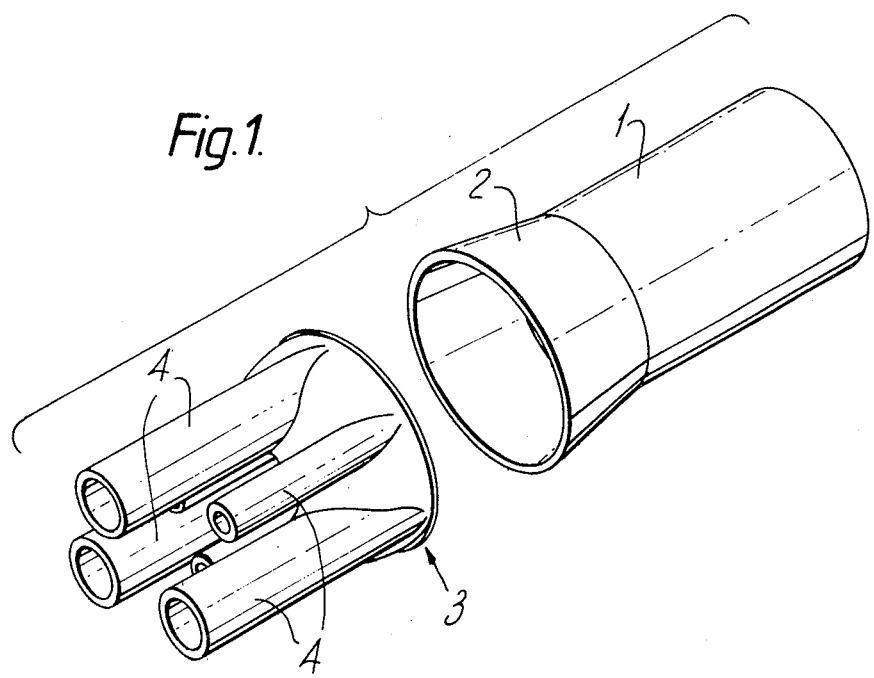
FIGS. 1 & 2 are isometric views showing one form of udder for an electrical cable branch in a partly formed state and a completely formed state respectively.
Figure 2:
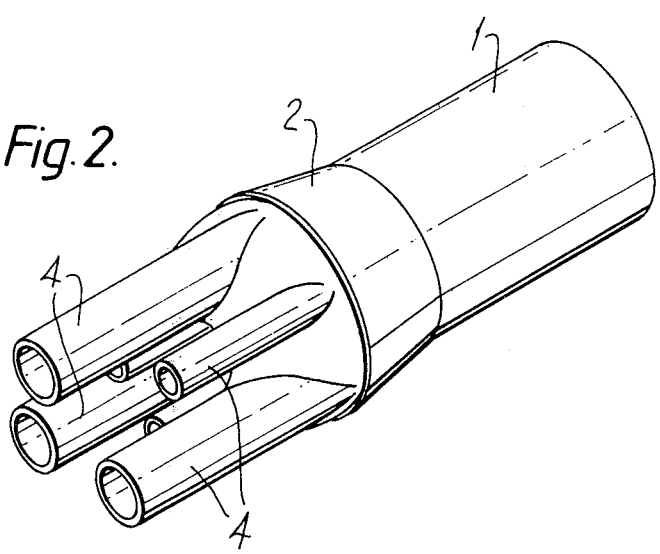

Referring to FIGS. 1 and 2 of the accompanying drawings an udder for electrical cable comprises an injection moulded component part 1 in the form of a right circular cylinder having a frusto-conical portion 2, and an injection moulded head component part 3 having a number of turrets 4 extending axially therefrom. As shown in FIG. 1, the diameter of the frusto-conical 2 increases in a direction away from the outlet of the part 1, and at the end of the portion 2 is equal to the diameter of the head-part 3. The head-part 3 is spin welded to the frusto-conical portion 2 or is joined by a hot-plate welding technique, optionally after a corresponding adhesive shape has been inserted in the head-part 3.

The polymeric material is then cross-linked by irradiation and the article is then expanded by inserting mandrels into the turrets 4. Alternatively, the head-part 4 may initially be formed with the turrets 4 having closed ends in which case the article may be expanded pneumatically and the closed ends of the turrets be removed subsequently.

Figure 3:
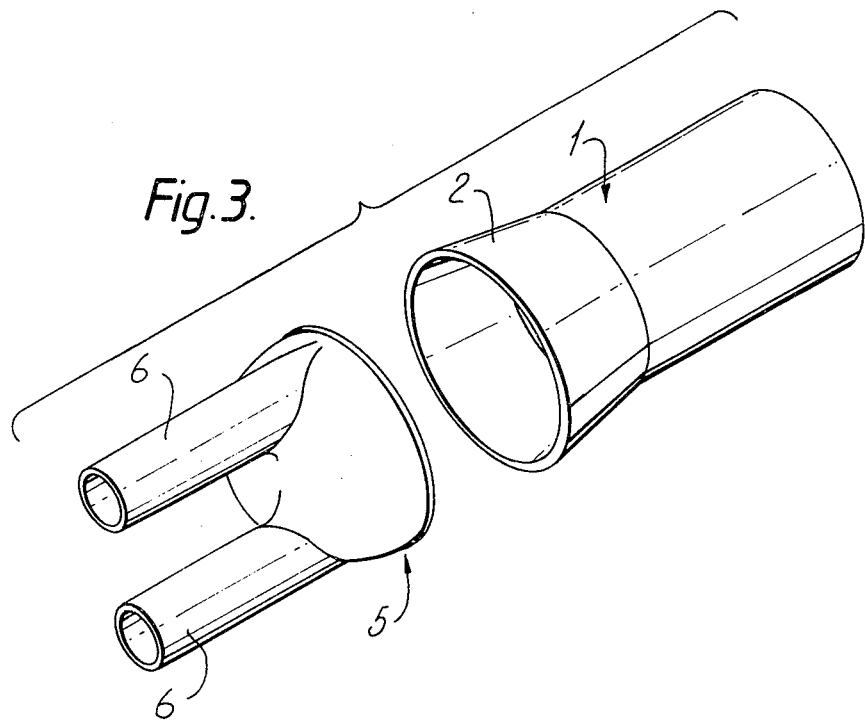
FIGS. 3 & 4 show a second form of udder.
Figure 4:
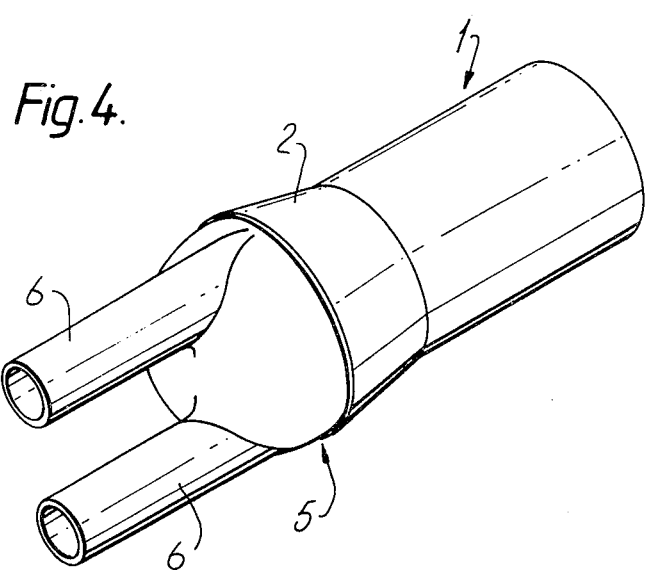

A similar udder is shown in FIGS. 3 and 4 in which a head-part 5 has only two turrets 6. The head-part 5 may be welded to a frusto-conical portion 2 of the component part 1 having the same dimensions as those shown in FIGS. 1 and 2, or the component part 1 may have indifferent dimensions. As will be apparent, a large number of udders having different shapes may be formed using only a small number of different component parts, and so reducing the number of moulds required for their formation.

Figure 5:
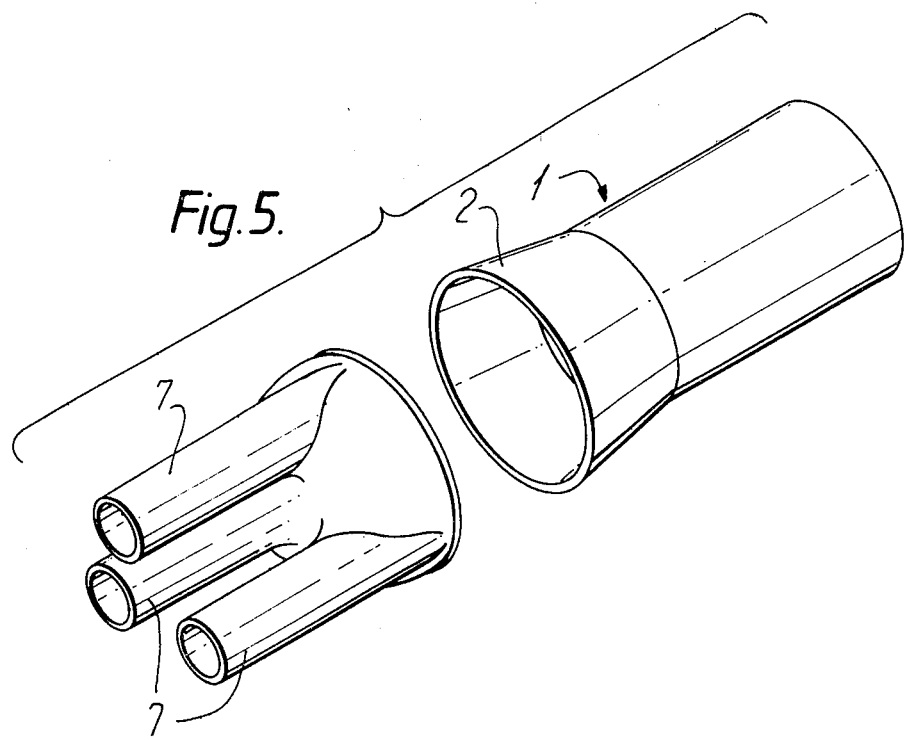
FIGS. 5 & 6 show a third form of udder.
Figure 6:
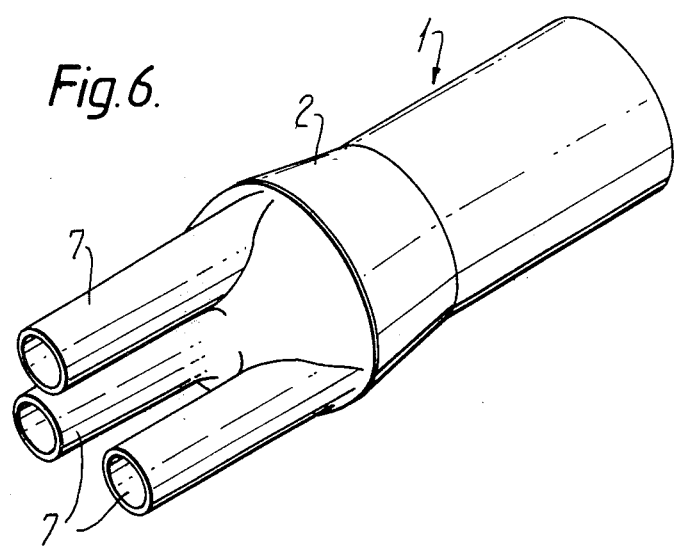

FIGS. 5 and 6 show a third form of udder that may be formed solely by changing the shape of the mould for the head-part to form an udder having three turrets 7.

Although the component part 1 of the udders as shown in FIGS. 1 to 6 has been formed in one piece by injection moulding, the frusto-conical portion 2 and the cylindrical portion could be formed separately, for example by injection moulding and extrusion respectively, in which case they would each constitute separate component parts of the udder.

Figure 7:
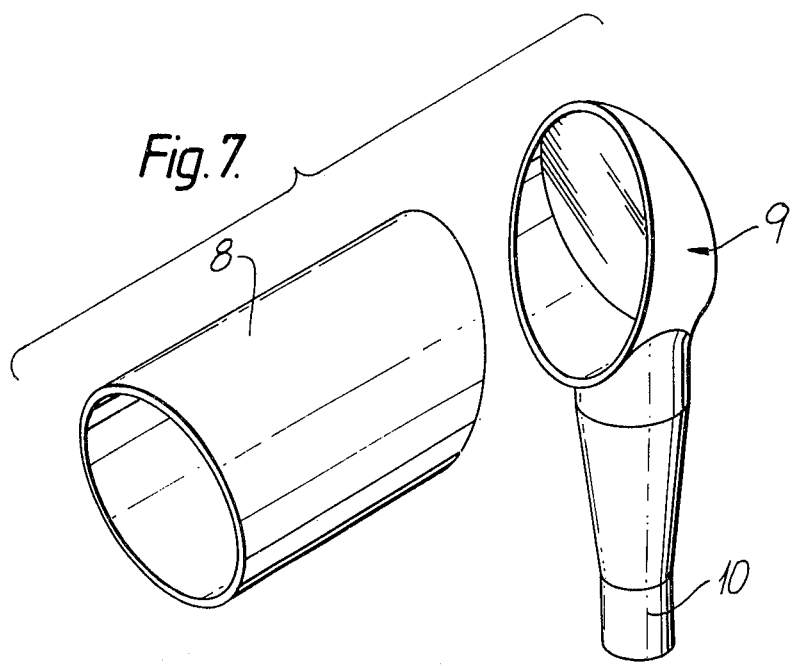
FIGS. 7 & 8 are isometric views of one form of boot for the termination of an electrical cable in a partly formed state and a completely formed state.
Figure 8:
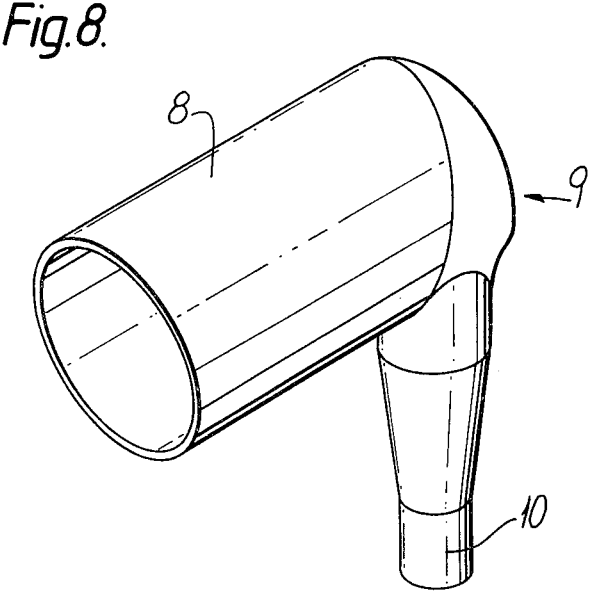

Referring to FIGS. 7 and 8, a right angled boot is shown which comprises a tubular part 8 which could be formed by extrusion but is preferably formed by a moulding process, and a head-part comprising a junction portion 9 and a single outlet 10. Depending on the shape of the head-part, it may be possible to form it as one piece by injection moulding, or the junction portion 9 and outlet 10 may be moulded separately and so constitute different component parts of the boot. After joining the component parts together, the boot is irradiated to cross-link the polymeric material, and expanded to the desired size.

Figure 9:
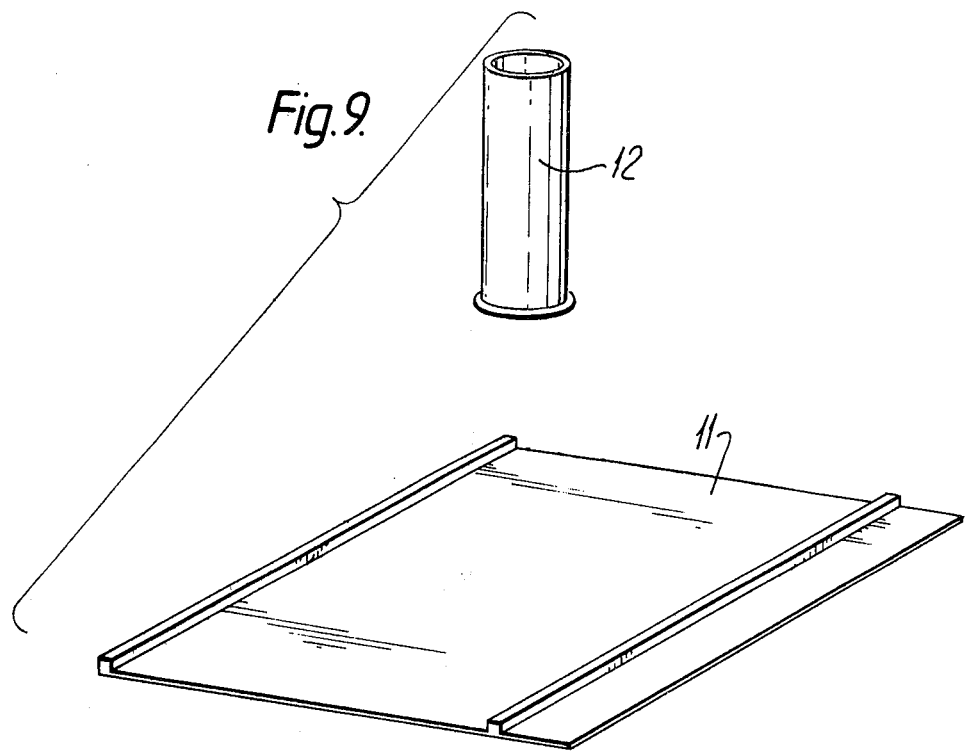
FIGS. 9 & 10 are isometric views of one form of a branch-out for an electrical cable in a partly formed state and a completely formed state.
Figure 10:
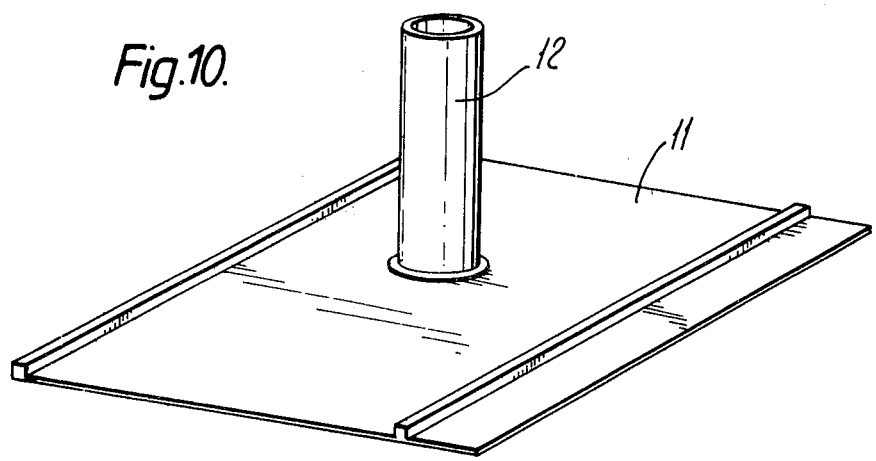

FIGS. 9 and 10 show a wrap-around branch-out for an electrical cable which comprises a cover 11 for enclosing the main body of the cable and a tubular side outlet 12 for enclosing a branch of the cable. Both the cover 11 and the outlet 12 may be formed by extrusion and then cut to length. The outlet 12 is then joined to the appropriate part of the cover 11 by ultrasonic, hot-plate or spin welding techniques. An aperture may be formed in the appropriate portion of the cover 11 before the outlet 12 is welded to it or, depending on the welding technique used, the welding step may form a line of weakness in the cover 11 adjacent to the point of welding that allows the aperture to be formed after the outlet 12 is welded to the cover 11.

The cover 11 is provided with a closure mechanism to join its edges together after it has been wrapped around a cable. Examples of adhesive and mechanical closure mechanisms are described in British Patent Specification No. 1,155,470, and U.S. Pat. Nos. 3,397,218 and 3,770,556, the disclosures of which are incorporated herein by reference. After formation of the article, it is heated and expanded, and cover being expanded on a flat-bed stretcher and the outlet being expanded on a mandrel.

I claim:

1. A process for the manufacture of an article that is dimensionally-heat-recoverable, which comprises the steps of forming a plurality of shaped component parts of the article from a polymeric material, assembling the component parts to form a hollow article, said article having at least one outlet and having internal lateral dimensions that are greater than the lateral dimensions of the or any outlets, bonding the component parts together, cross-linking the polymeric material after the component parts have been bonded together and then applying heat to expand at least a portion of the article to bring that portion of the article to a temperature above its crystalline melting point, or, for amorphous materials, the softening point of the polymer.

2. A process as claimed in claim 1, wherein the component parts are bonded together by welding.

3. A process as claimed in claim 2, wherein the component parts are welded by a frictional or thermal welding process.

4. A process as claimed in claim 3, wherein the parts have a circular cross-section in the region where they are to be welded together, and are welded by a spin welding process.

5. A process as claimed in claim 1, wherein at least some of the component parts have been formed by extrusion.

6. A process as claimed in claim 1, wherein at least two component parts are formed from different materials.

7. A process as claimed in claim 1, wherein a preformed mass of adhesive is positioned within one or more component parts before they are joined together.

8. A process as claimed in claim 1, wherein the polymeric material is cross-linked by irradiation.

9. A process as claimed in claim 8, wherein the polymeric material is cross-linked by electron irradiation.

10. A process as claimed in any one of claims 1 to 9, wherein the article is dimensionally heat-recoverable.

* * * * *